(12) United States Patent
Dierksmeier et al.

(10) Patent No.: US 11,619,170 B1
(45) Date of Patent: Apr. 4, 2023

(54) GAS TURBINE ENGINE WITH RADIAL TURBINE HAVING MODULATED FUEL COOLED COOLING AIR

(71) Applicant: Rolls-Royce North American Technologies Inc., Indianapolis, IN (US)

(72) Inventors: Douglas D. Dierksmeier, Franklin, IN (US); Michael A. Karam, Plainfield, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 17/688,465

(22) Filed: Mar. 7, 2022

(51) Int. Cl.
*F02C 7/18* (2006.01)
*F02C 6/08* (2006.01)
*F02C 3/08* (2006.01)
*F02C 9/18* (2006.01)

(52) U.S. Cl.
CPC ............... *F02C 7/185* (2013.01); *F02C 6/08* (2013.01); *F02C 3/08* (2013.01); *F02C 9/18* (2013.01); *F05D 2220/32* (2013.01); *F05D 2230/60* (2013.01); *F05D 2240/12* (2013.01); *F05D 2240/35* (2013.01); *F05D 2250/52* (2013.01); *F05D 2260/213* (2013.01)

(58) Field of Classification Search
CPC .... F01D 5/048; F02C 6/08; F02C 9/18; F02C 3/085; F02C 7/224
See application file for complete search history.

(56) References Cited

U.S. PATENT DOCUMENTS

| | | | | |
|---|---|---|---|---|
| 3,285,006 A | * | 11/1966 | Freeman | F23R 3/52 60/751 |
| 3,588,268 A | * | 6/1971 | Hampton | F04D 27/023 415/145 |
| 4,923,370 A | * | 5/1990 | Larson | F01D 5/043 416/185 |
| 5,555,721 A | | 9/1996 | Bourneuf et al. | |
| 5,845,482 A | * | 12/1998 | Carscallen | F04D 27/023 60/226.3 |
| 8,800,291 B2 | * | 8/2014 | Bil | F02C 6/08 60/751 |
| 9,726,022 B2 | * | 8/2017 | Mittendorf | F01D 5/18 |
| 10,113,486 B2 | * | 10/2018 | Mueller | F01D 5/02 |
| 10,208,668 B2 | * | 2/2019 | Clegg | F02C 7/12 |
| 10,393,128 B2 | * | 8/2019 | Urac | F04D 27/0215 |

(Continued)

*Primary Examiner* — Todd E Manahan
*Assistant Examiner* — Thuyhang N Nguyen
(74) *Attorney, Agent, or Firm* — Barnes & Thornburg LLP

(57) ABSTRACT

A gas turbine engine includes a centrifugal compressor, a combustor, a radial turbine, and a cooling air metering system. The centrifugal compressor is configured to rotate about an axis to produce compressed air. The combustor is fluidly connected downstream of the centrifugal compressor to receive the compressed air from the centrifugal compressor. The radial turbine is fluidly connected with the combustor and is axially spaced apart from the centrifugal compressor. The cooling air metering system is configured to selectively block or allow a portion of the compressed air flowing radially between the centrifugal compressor and the radial turbine, bypassing the combustor, and through a heat exchanger for cooling the radial turbine and other components.

18 Claims, 6 Drawing Sheets

(56) References Cited

U.S. PATENT DOCUMENTS

| | | | |
|---|---|---|---|
| 10,627,167 B2 * | 4/2020 | Sampath | F02C 7/185 |
| 10,808,616 B2 | 10/2020 | Suciu et al. | |
| 10,830,138 B2 | 11/2020 | Manteiga et al. | |
| 10,830,147 B2 * | 11/2020 | Snyder | F02C 7/185 |
| 2015/0159555 A1 * | 6/2015 | Heinrich | F02C 7/224 |
| | | | 60/726 |
| 2020/0158019 A1 * | 5/2020 | Kawai | F02C 7/224 |

* cited by examiner

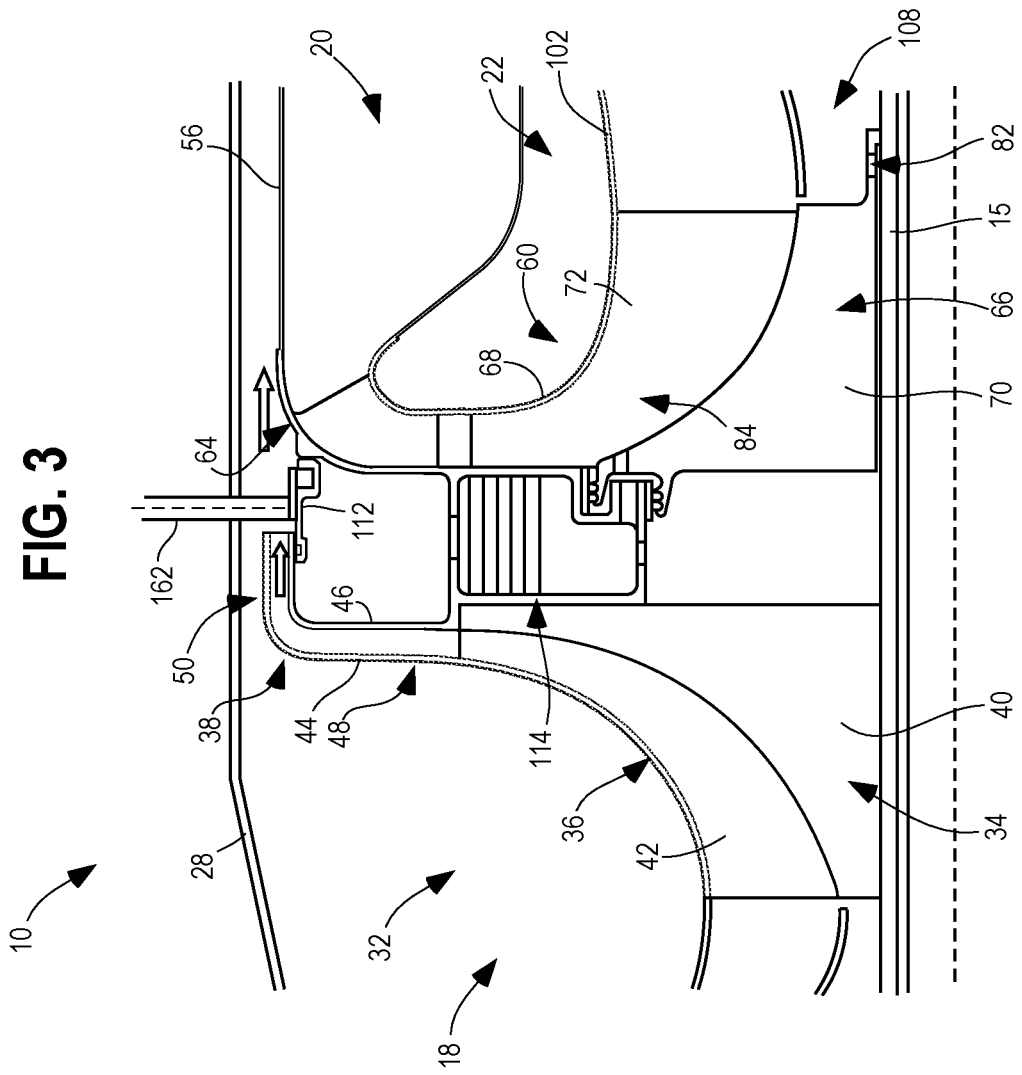

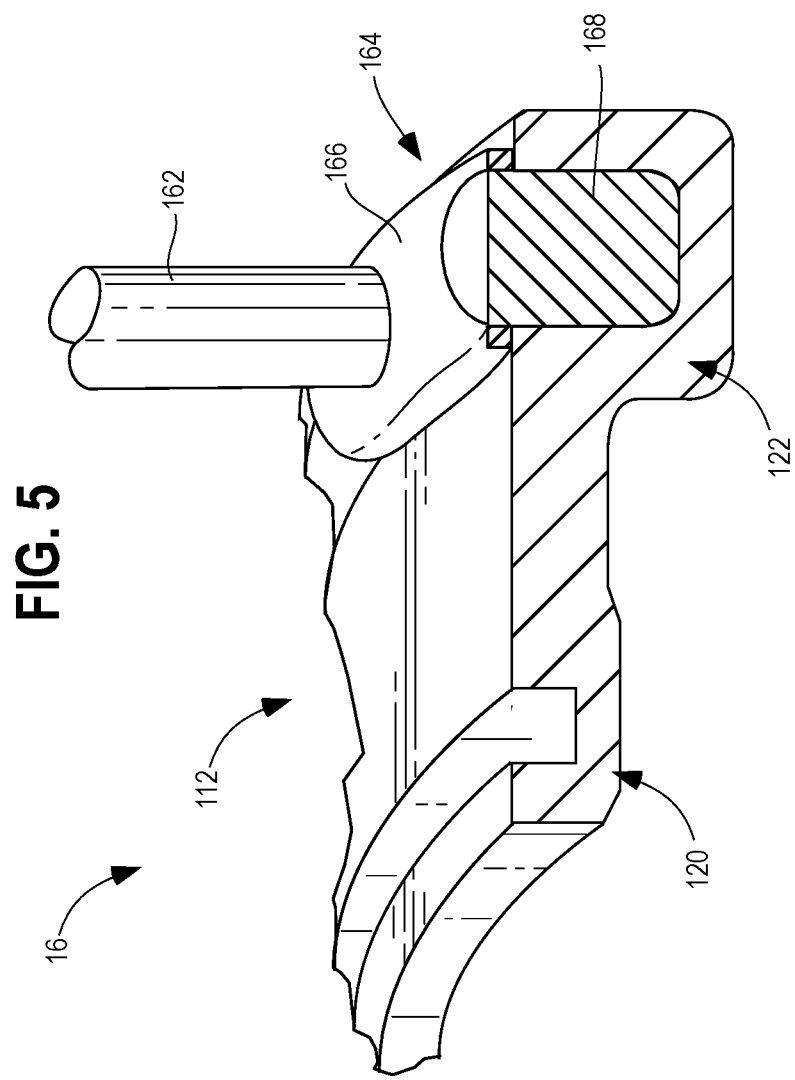

GAS TURBINE ENGINE WITH RADIAL TURBINE HAVING MODULATED FUEL COOLED COOLING AIR

STATEMENT REGARDING FEDERALLY SPONSORED RESEARCH OR DEVELOPMENT

Embodiments of the present disclosure were made with government support under Contract Nos. FA8650-19-D-2063 and FA8650-19-F-2093. The government may have certain rights.

FIELD OF THE DISCLOSURE

The present disclosure relates generally to gas turbine engines, and more specifically to systems for cooling radial turbine sections in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Turbine components are exposed to high temperatures from products of the combustion reaction in the combustor. Typical gas turbine engines include cooling systems that direct a portion of compressed air from the compressor to components of the turbine to cool the components during operation of the gas turbine engine. Controlling when cooling air is provided and the amount of cooling air provided remains an area of interest for making efficient use of the compressed air.

SUMMARY

The present disclosure may comprise one or more of the following features and combinations thereof.

According to an aspect of the present disclosure, a gas turbine engine includes a centrifugal compressor, a combustor, a radial turbine, and a cooling air metering system. The centrifugal compressor includes a compressor impeller configured to rotate about an axis to produce compressed air and a diffuser located radially outward and downstream of the compressor impeller. The combustor is located axially aft of the centrifugal compressor and is configured to receive the compressed air from the centrifugal compressor. The radial turbine is located axially aft of the centrifugal compressor and fluidly connected to the combustor. The cooling air metering system is configured to selectively control a flowpath of the compressed air for cooling the radial turbine.

The cooling air metering system includes a metering ring, a heat exchanger, and an actuator. The metering ring extends circumferentially around the axis and is located axially between the diffuser and the combustor. The heat exchanger is located axially between the centrifugal compressor and the combustor and radially inward of the metering ring. The actuator is coupled with the metering ring. The actuator is configured to move the metering ring axially between an open position in which the metering ring is spaced apart axially from the radial turbine to allow the compressed air to flow radially inward between the centrifugal compressor and the radial turbine through the heat exchanger and into the radial turbine and a closed position in which the metering ring is located axially adjacent the radial turbine to block the compressed air from flowing radially inward between the centrifugal compressor and the radial turbine.

In some embodiments, a forward section of the metering ring is engaged with a radial inner surface of the diffuser. The forward section is configured to slide axially along the diffuser between the open position and the closed position.

In some embodiments, the radial turbine includes a turbine wheel having a turbine impeller hub that extends circumferentially about the axis and a turbine impeller blade that extends outward away from the turbine impeller hub. The turbine impeller hub is formed to define a first cooling hole that extends through the turbine impeller hub at an axial forward end of the turbine impeller hub. The turbine impeller blade is formed to define a cooling passageway therein that is in fluid communication with the first cooling hole. The first cooling hole is configured to receive the compressed air in response to the metering ring being in the open position.

In some embodiments, the cooling air metering system includes a heat exchanger assembly that includes the heat exchanger and a duct insert that supports the heat exchanger in place. The duct insert is formed to define a cavity that receives the compressed air after the compressed air flows through the heat exchanger. The duct insert includes an outlet ring having a plurality of vanes configured to direct the compressed air out of the cavity and into the first cooling hole.

In some embodiments, the turbine impeller blade is formed to define a cavity therein to define the cooling passageway. In some embodiments, the turbine impeller hub is formed to define a second cooling hole that extends radially through the turbine impeller hub at an axial aft end of the turbine impeller hub. The second cooling hole is in fluid communication with the compressed air in response to the metering ring being in the open position.

In some embodiments, the cooling air metering system further includes a controller connected with heat exchanger. The controller is programmed to vary a flow of cooling fluid through the heat exchanger so as to vary selectively a temperature of the compressed air.

In some embodiments, the cooling air metering system further includes a controller connected with the actuator. The controller is programmed to cause the actuator to move the metering ring to the closed position in response to the gas turbine engine being in a cruise condition and to move the metering ring to the open position in response to the gas turbine engine being in a takeoff or climb condition.

According to another aspect, a gas turbine engine includes a centrifugal compressor, a radial turbine, and a cooling air metering system. The centrifugal compressor is configured to produce compressed air. The radial turbine is located axially aft of the centrifugal compressor relative to an axis of the gas turbine engine. The cooling air metering system includes a metering ring and an actuator.

In some embodiments, the metering ring extends circumferentially around the axis and is located axially between the centrifugal compressor and the radial turbine. The actuator is coupled with the metering ring and configured to move the metering ring between an open position in which the metering ring opens a gap between the radial turbine and the centrifugal compressor to allow the compressed air to flow between the centrifugal compressor and the radial turbine and a closed position in which the metering ring closes the gap to block the compressed air from flowing between the centrifugal compressor and the radial turbine.

In some embodiments, the cooling air metering system further comprises a heat exchanger assembly that includes a heat exchanger located between the centrifugal compressor and the radial turbine. The heat exchanger assembly is configured to receive the compressed air in response to the metering ring being in the open position.

In some embodiments, the heat exchanger assembly further includes a duct insert located axially between the centrifugal compressor and the radial turbine. The heat exchanger is supported by the duct insert. The duct insert is formed to define a plurality of radial outer holes and a plurality of radial inner holes to allow the compressed air to flow radially through the duct insert.

In some embodiments, the duct insert is formed to define an outlet ring having a plurality of vanes that define passages through the duct insert. The passages are configured to direct the compressed air toward the radial turbine in response to the metering ring being in the open position.

In some embodiments, the radial turbine includes a turbine wheel having a turbine impeller hub that extends circumferentially about the axis and a turbine impeller blade that extends outward away from the turbine impeller hub. The turbine impeller hub is formed to define a first cooling hole that extends through the turbine impeller hub at an axial forward end of the turbine impeller hub. The turbine impeller blade is formed to define a cooling passageway inside the turbine impeller blade that is in fluid communication with the first cooling hole.

In some embodiments, the cooling air metering system further includes a controller connected with the actuator and with the heat exchanger. The controller is programmed to at least one of move the metering ring between the open and the closed position and vary a flow of cooling fluid through the heat exchanger to modulate the compressed air, cool the compressed air, or both.

In some embodiments, the radial turbine includes a turbine wheel having a turbine impeller hub that extends circumferentially about the axis and a turbine impeller blade that extends outward away from the turbine impeller hub. The turbine impeller hub is formed to define a cooling hole that extends radially through the turbine impeller hub at an axial aft end of the turbine impeller hub.

In some embodiments, the cooling air metering system further includes a controller connected with the actuator. The controller is programmed to cause the actuator to move the metering ring to the closed position in response to the gas turbine engine being in a cruise condition and to move the metering ring to the open position in response to the gas turbine engine being in a takeoff or climb condition.

According to another aspect, a method of operating a gas turbine engine includes a number of steps. The steps may include compressing air with a centrifugal compressor, mixing fuel with the air and combusting the fuel and the air with a combustor to form combusted gases, rotating a radial turbine about an axis with the combusted gases, moving a metering ring relative to the centrifugal compressor and the radial turbine between an open position in which a portion of the air is allowed to flow radially inward between the centrifugal compressor and the radial turbine and a closed position in which the air is blocked from flowing radially inward between the centrifugal compressor and the radial turbine, and directing the portion of the air into a turbine impeller blade of the radial turbine in response to the metering ring being in the open position.

In some embodiments, the method further includes moving the metering ring to the closed position in response to the gas turbine engine being in a cruise condition. The method includes moving the metering ring to the open position in response to the gas turbine engine being in a takeoff or climb condition. In some embodiments, the method further includes directing the portion of the air through a heat exchanger and varying a flow of cooling fluid through the heat exchanger so as to vary a temperature of the portion of the air.

In some embodiments, the radial turbine includes a turbine wheel having a turbine impeller hub that extends circumferentially about the axis and the turbine impeller blade that extends outward away from the turbine impeller hub. The turbine impeller hub is formed to define a first cooling hole that extends through the turbine impeller hub at an axial forward end of the turbine impeller hub and a second cooling hole that extends radially through the turbine impeller hub at an axial aft end of the turbine impeller hub. The turbine impeller blade is formed to define a cooling passageway therein that is in fluid communication with the first cooling hole, and the first cooling hole is configured to receive the portion of the air in response to the metering ring being in the open position.

These and other features of the present disclosure will become more apparent from the following description of the illustrative embodiments.

BRIEF DESCRIPTION OF THE DRAWINGS

FIG. 3 is a side section view of a portion of the gas turbine engine of FIG. 1 showing the metering ring in a closed position in which the metering ring blocks the cooling air from flowing radially inward through the heat exchanger or turbine section;

FIG. 5 is a perspective cutaway view of the cooling air metering system showing that the actuator is coupled with the metering ring to provide a cam action so that rotation of the actuator shaft causes the metering ring to move axially forward or aft.

DETAILED DESCRIPTION OF THE DRAWINGS

Figure 1:
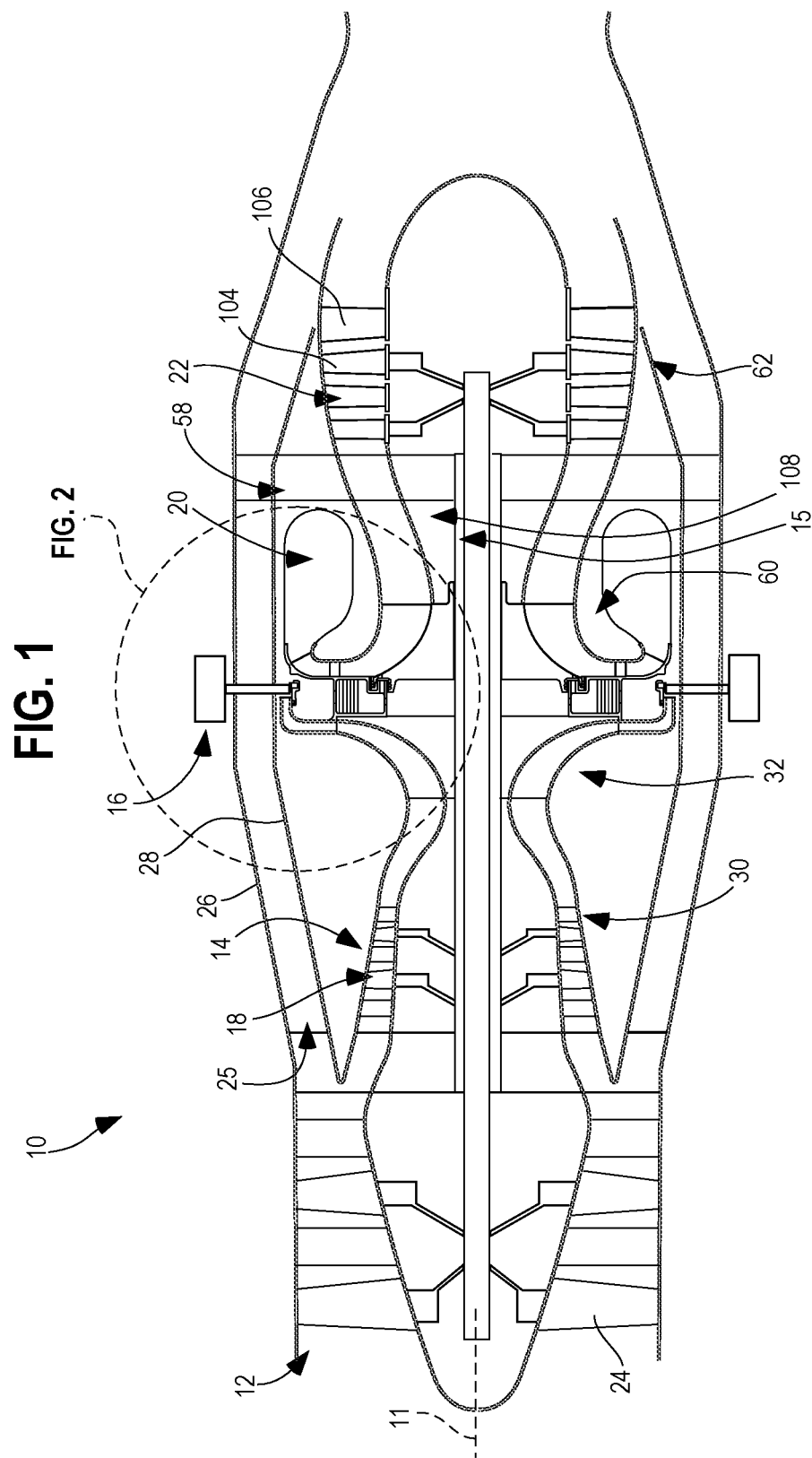
FIG. 1 is a cutaway view of a gas turbine engine having a fan assembly, a compressor section, a combustor section, a turbine section and a cooling air metering system configured to control an amount of cooling air directed from the compressor section and into the turbine section.

For the purposes of promoting an understanding of the principles of the disclosure, reference will now be made to a number of illustrative embodiments illustrated in the drawings and specific language will be used to describe the same.

Referring to FIG. 1, a gas turbine engine 10 is illustrated having a fan assembly 12, an engine core 14, and a cooling air metering system 16. The engine core 14 includes a compressor 18, a combustor 20, and a turbine 22, which together can be used to produce power. Air enters the gas turbine engine 10, is compressed through action of the compressor 18, mixed with a fuel, and combusted in the combustor 20. The turbine 22 is arranged to receive a flow from the combustor 20 and extract useful work from the flow. The fan assembly 12 includes fan blades 24 configured to be rotated about an axis 11 by the turbine 22. The fan blades 24 push air aft through a bypass duct 25 to provide thrust for propelling an aircraft for example. Further, the present disclosure contemplates use in other applications that may not be aircraft related such as industrial fan applications, power generation, pumping sets, naval propulsion, weapon systems, security systems, perimeter defense/security systems, and the like known to one of ordinary skill in the art.

The bypass duct 25 includes an outer bypass wall 26 and an inner bypass wall 28 arranged circumferentially about the axis 11 as shown in FIG. 1. The inner bypass wall 28 is arranged around the compressor 18, combustor 20, and turbine 22. The outer bypass wall 26 is arranged circumferentially around the inner bypass wall 28 to define a radial space for the bypass air to flow through and around the compressor 18, combustor 20, and turbine 22.

Figure 2:
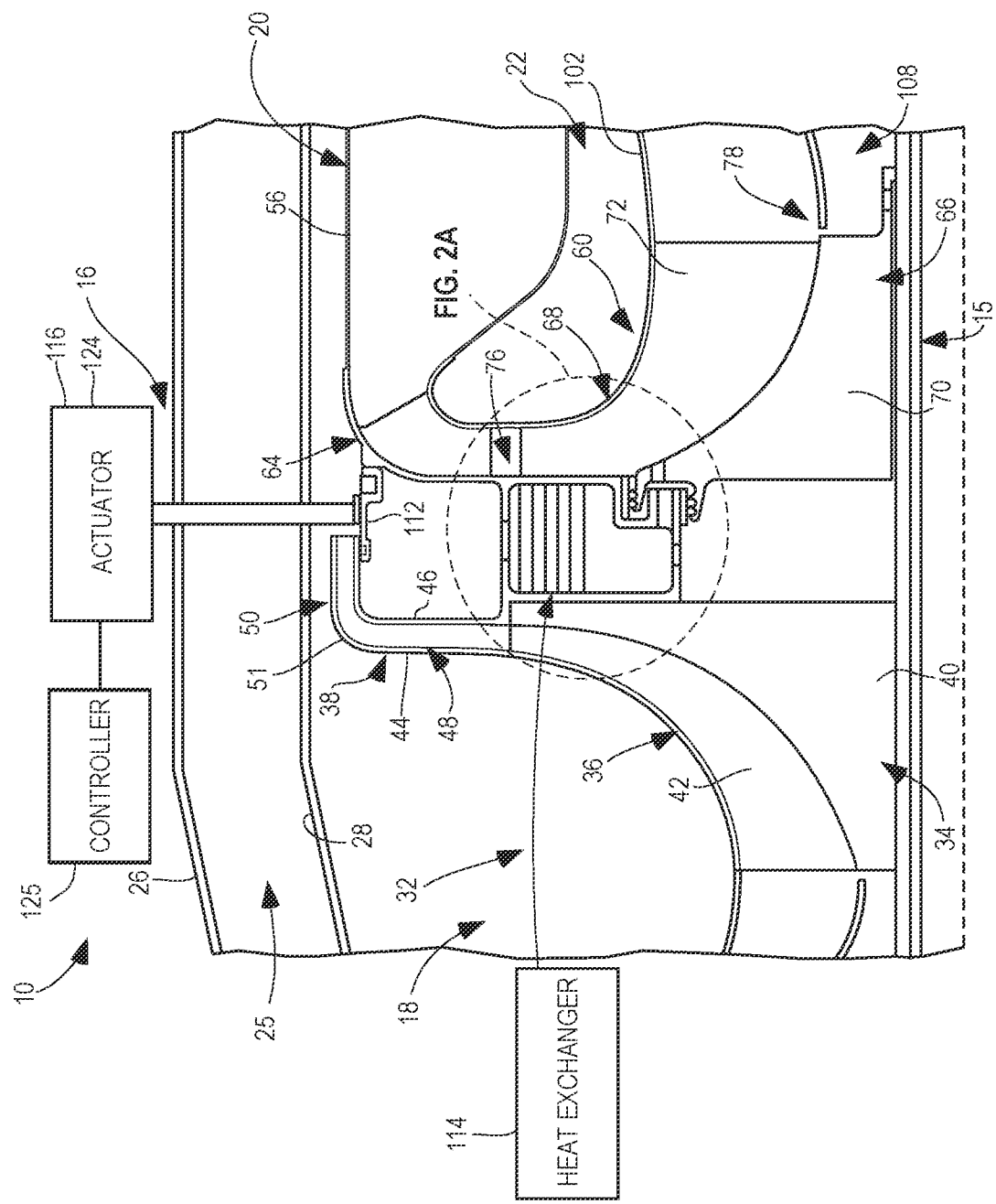
FIG. 2 is an enlarged view of a portion of the gas turbine engine of FIG. 1 showing the cooling air metering system includes a metering ring located between an impeller of the compressor section and a radial turbine of the turbine section, a heat exchanger located between the impeller and the radial turbine, and an actuator connected with the metering ring.

The compressor 18 illustratively includes an axial compressor 30 and a centrifugal compressor 32 in fluid communication and downstream of the axial compressor 30 in the illustrative embodiment as shown in FIG. 2. In some embodiments, the axial compressor 30 may be omitted. The axial compressor 30 includes one or more stages of rotatable blades and static vanes. The axial compressor 30 is coupled with an axial turbine 62 via a shaft 15.

The centrifugal compressor 32 includes a compressor impeller 34, a compressor shroud 36 arranged circumferentially around the compressor impeller 34, and a diffuser 38 as shown in FIG. 2. The compressor impeller 34 includes a compressor impeller hub 40 and a plurality of impeller blades 42 that extend radially outward from the compressor impeller hub 40 such that rotation of the compressor impeller 34 about the axis 11 compresses air and pushes the compressed air radially outward into the diffuser 38. The compressor shroud 36 is arranged around the compressor impeller 34 to block the air being compressed from passing over tips of the blades of the impeller and to guide the compressed air downstream. The diffuser 38 is fluidly connected with the compressor impeller 34 and receives the flow of compressed air from the compressor impeller 34 to lower the velocity and control swirl of the compressed air.

The diffuser 38 directs the compressed air out of the centrifugal compressor 32 axially aft so that the compressed air flows radially between the inner bypass wall 28 and a liner 56 of the combustor 20 as suggested in FIG. 3. The illustrative diffuser 38 includes an outer wall 44 and an inner wall 46 as shown in FIG. 2. The outer wall 44 and the inner wall 46 cooperate to define a passageway that receives compressed air radially from the compressor impeller 34 and directs the compressed air axially aft out of the diffuser 38. Illustratively, the outer wall 44 and the inner wall 46 define a first section 48 and a second section 50. The first section 48 extends radially outward away from the compressor impeller 34 and the second section 50 extends axially aft from the first section 48. The first section 48 and the second section 50 are fluidly connected via a curved joint 51.

The combustor 20 is located downstream and illustrative axially aft of the compressor 18 as shown in FIG. 2. The combustor 20 includes, among other things, the combustor liner 56 and a plurality of fuel injectors and ignitors. In the illustrative embodiment, the inlet into the combustor 20 is located at an axially aft end of the combustor 20. As a result, the compressed air exiting the compressor 18 flows radially between the combustor liner 56 and the inner bypass wall 28 to the aft end of the combustor 20 and into the inlet. In the combustor 20, the compressed air is mixed with fuel and ignited by the fuel injectors and ignitors.

The turbine 22 includes a radial turbine 60 and an axial turbine 62 as shown in FIG. 1. The radial turbine 60 is fluidly connected with an outlet of the combustor 20 and configured to receive the combusted gases from the combustor 20. The axial turbine 62 is fluidly connected downstream of and located axially aft of the radial turbine 60. The radial turbine 60 is connected with the centrifugal compressor 32 and configured to drive the centrifugal compressor 32 to rotate about the axis 11. The axial turbine 62 is connected with the axial compressor 30 and the fan assembly 12 to drive the axial compressor 30 and the fan assembly 12 to rotate about the axis 11.

The radial turbine 60 includes an inlet duct 64, a turbine wheel 66, and a turbine shroud 68 as shown in FIG. 2. The inlet duct 64 directs the combusted gases from the combustor 20 to the turbine wheel 66. The turbine wheel 66 is rotated about the axis 11 by the combusted gases to drive rotation of the compressor impeller 34. The turbine shroud 68 is arranged circumferentially about the turbine wheel 66 to block gases from passing over the turbine wheel 66 and to direct the gases toward the axial turbine 62.

The turbine wheel 66 includes a turbine impeller hub 70 and a plurality of turbine impeller blades 72 that extend radially outward from the turbine impeller hub 70 as shown in FIG. 2. The turbine impeller hub 70 is illustratively coupled with the compressor impeller hub 40 for rotation therewith. Cooling air may flow radially inward between the compressor impeller 34 and the turbine wheel 66 toward the shaft 15. The turbine impeller blades 72 are fixed with the turbine impeller hub 70 for rotation with the turbine impeller hub 70 about the axis 11.

The turbine impeller hub 70 has a first diameter at a first axial end 76 and a second diameter at a second axial end 78 as shown in FIG. 2. The first diameter is greater than the second diameter. The first axial end 76 is formed to include a plurality of cooling holes 80 that extend axially through the first axial end 76 at a radial outer end of the turbine impeller hub 70. The plurality of cooling holes 80 are spaced apart from one another circumferentially relative to the axis 11. The second axial end 78 of the turbine impeller hub 70 is formed to define a plurality of cooling holes 82 that extends radially through the second axial end 78. The plurality of cooling holes 82 are spaced apart from one another circumferentially relative to the axis. The turbine impeller hub 70 illustratively further includes seal features 83, 85 at the first axial end 76.

Each turbine impeller blade 72 is formed to define a cooling passageway 84 therein as shown in FIG. 2. Each turbine impeller blade 72 includes external walls 86 formed to define a cavity 88 in the blade 72. Each turbine impeller blade 72 includes an inlet that fluidly connects the cavity 88 with one of the plurality of cooling holes 80 and an outlet that directs the cooling air axially out of the turbine impeller blade 72 into the gas path toward the axial turbine 62.

In the illustrative embodiment, the inlet is spaced apart radially from a radially outer end of the turbine impeller blade 72 and is located at the first axial end 76 of the turbine impeller hub 70 with the plurality of cooling holes 80 as shown in FIG. 2. The cavity 88 extends substantially across the entire area of the turbine impeller blade 72 such that the turbine impeller blade 72 has relatively thin wall thickness around the perimeter of the blade 72.

The axial turbine 62 includes a transition duct 102, a plurality of rotatable bladed wheels 104, and a plurality of static vanes 106 each located aft of a rotatable bladed wheel 104 as shown in FIGS. 1 and 2. The transition duct 102 directs the gases from the radial turbine 60 axially aft and, illustratively, radially outward to a first stage of the plurality of rotatable bladed wheels 104. In the illustrative embodiment, the transition duct 102 is empty and does not contain any protrusions or vanes in the gas path. The rotatable bladed wheels 104 are rotated by the gases passing through the axial turbine 62 and such rotation drives rotation of the rotatable bladed wheels of the axial compressor 30 and the fan assembly 12 about the axis 11. Each one of the plurality of static vanes 106 is located aft of a stage of the rotatable bladed wheels 104 to redirect the gases.

The transition duct 102 and the second axial end 78 of the turbine wheel 66 define an air cavity 108 radially inward of the transition duct 102 as shown in FIGS. 1 and 2. The plurality of cooling holes 82 formed in the turbine impeller hub 70 are in fluid communication with the cavity 108 to selectively feed cooling air into the cavity 108. The air cavity 108 may be in fluid communication with components of the axial turbine 62 so that the cooling air delivered to the air cavity 108 can be supplied to those components and cool said components.

The cooling air metering system 16 includes a metering ring 112, a heat exchanger assembly 114, and an actuator 116 as shown in FIGS. 1 and 2. The metering ring 112 is configured to move axially between a closed position, shown in FIG. 3, and an open position, shown in FIG. 4, to block or allow the cooling air to flow radially inward between the centrifugal compressor 32 and the radial turbine 60 as suggested in FIGS. 3 and 4. The heat exchanger assembly 114 is configured to cool the cooling air as the cooling air flows radially inward between the centrifugal compressor 32 and the radial turbine 60. The actuator 116 is coupled with the metering ring 112 and configured to move the metering ring 112 between the closed position and the open position and to hold the metering ring 112 in those positions and any position therebetween.

Figure 4:
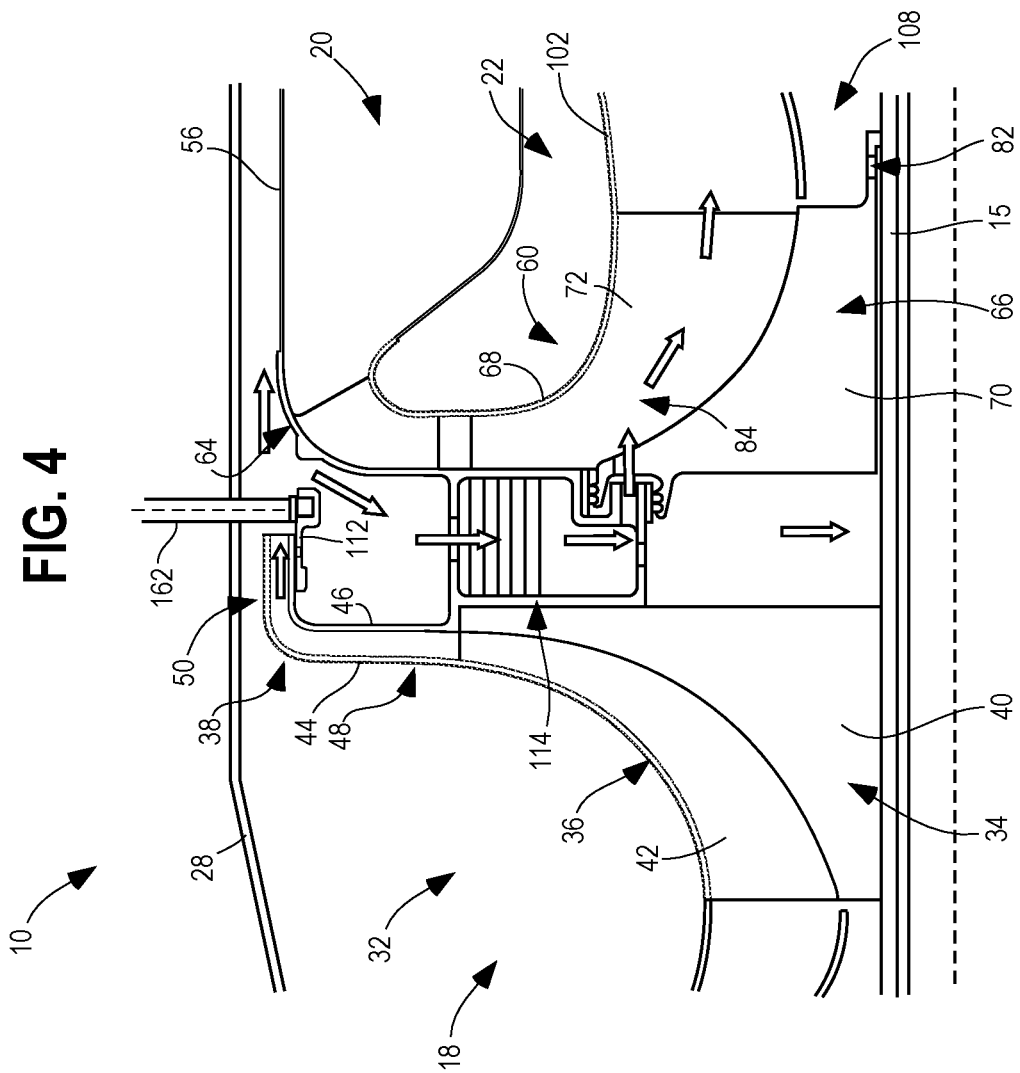
FIG. 4 is a side section view of the portion of the gas turbine engine of FIG. 3 showing the metering ring in an open position in which the metering ring allows the cooling air to flow from the compressor section radially inward through the heat exchanger and into turbine section to cool the radial turbine and turbine section components.

The metering ring 112 is annular and extends circumferentially fully around the axis 11 as suggested in FIGS. 3-5. The metering ring 112 has a forward end and an axial aft end. The axial forward end is engaged with the inner wall 46 of the diffuser 38 as shown in FIG. 3. The axial aft end is engaged with the inlet duct 64 of the radial turbine 60 when the metering ring 112 is in the closed position as shown in FIG. 3 and spaced apart axially from the inlet duct 64 when in an open position up to and including the fully open position. In other embodiments, the diffuser 38 could be omitted and the centrifugal compressor 32 includes ducting with geometry that provides a sliding surface for the metering ring 112.

The illustrative metering ring 112 includes a forward section 120 and an aft section 122 as shown in FIG. 5. The forward section 120 includes a radially inwardly extending channel for receiving a seal therein. The aft section is illustratively formed to include holes to receive shafts 168 therein. The aft section 122 is thicker radially than the forward section 120.

The heat exchanger assembly 114 includes a heat exchanger 126 and a duct insert 128 as shown in FIGS. 2-4. The heat exchanger 126 is a fuel/air heat exchanger that transfers heat from the cooling air to fuel from the gas turbine engine 10 that passes through the heat exchanger 126. The heat exchanger 126 extends circumferentially at least partway around the axis 11. The duct insert 128 is located axially between the centrifugal compressor 32 and the radial turbine 60 and supports the heat exchanger 126 as well as guide the cooling air into the radial turbine 60 as discussed below.

The duct insert 128 extends circumferentially about the axis 11 as shown in FIGS. 2-4. The duct insert 128 includes a radial outer wall 130, a radial inner wall 132, a first side wall 134, and a second side wall 136 that cooperate to define a cavity 138. The first side wall 134 confronts a back side of the compressor impeller 34. The second side wall 136 confronts the forward side of the turbine wheel 66. The radial outer wall 108 extends axially between and connects the first side wall 134 and the second side wall 136. The radial outer wall 108 is formed to define holes 140 or other passages that allow cooling air to flow radially inward through the radial outer wall 108 and the heat exchanger 126 and into the cavity 138. The radial inner wall 132 extends axially between and connects the first side wall 134 and the second side wall. The radial inner wall 132 is formed to define holes 142 or other passages that allow the cooling air to flow radially inward through the radial inner wall 132 and toward the shaft 15.

Figure 2A:
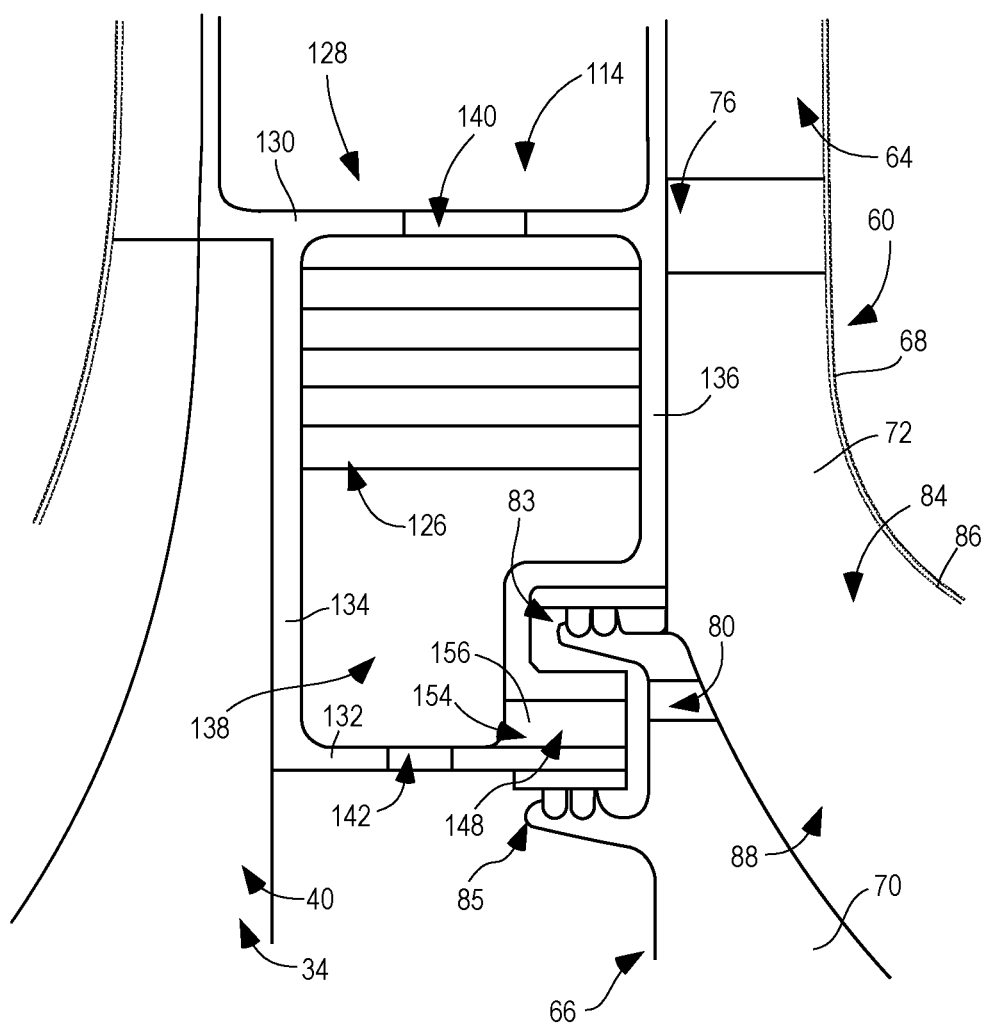
FIG. 2A is a detailed view of a portion of FIG. 2 showing the cooling air metering system.

The second side wall 136 of the duct insert 128 includes a first seal land, a second seal land, and an outlet ring 148 as shown in FIG. 2A. The first seal land is engaged with the seal 83 of the turbine impeller hub 70. The second seal land is engaged with the seal 85 of the turbine impeller hub 70. The outlet ring 148 is configured to direct a portion of the cooling air out of the air cavity 138 and into the cooling holes 80 of the turbine impeller hub 70 and, thus, into the cooling passageway 84 of the turbine impeller blades 72.

The outlet ring 148 is formed to define a plurality of passages 154 that extend axially through the second side wall 136. The illustrative outlet ring 148 includes a plurality of vanes 156 that extend radially and are spaced apart from one another circumferentially to define the plurality of passages 154. The plurality of passages 154 are at least partially radially aligned with and open axially adjacent the cooling holes 80 formed in the turbine impeller hub 70 so that the cooling air exiting through the outlet ring 148 is directed into the cooling holes 80 as the turbine wheel 66 rotates about the axis 11.

The actuator 116 includes a rotary actuator 124, a torque shaft 162, and a cam unit 164 as shown in FIGS. 2 and 5. The rotary actuator 124 is configured to produce selectively rotational motion using fuel, air, and/or electric energy. The torque shaft 162 is coupled with the rotary actuator 124 and the cam unit 164 and configured to transfer the rotational motion from the rotary actuator 124 to the cam unit 164. The cam unit 164 is coupled with the metering ring 112 and configured to transfer the rotational motion into axial and linear motion of the metering ring 112. In the example embodiment, the gas turbine engine includes three actuators each having a rotary actuator 124, a torque shaft 162 and a cam unit 164. The three actuators being spaced apart circumferentially generally equidistant about the axis 11.

The rotary actuator 124 is located radially outside of the outer bypass wall 26 in the illustrative embodiment. The torque shaft 162 extends radially inward through the outer bypass wall 26 and the inner bypass wall 28. The torque shaft 162 may pass through a strut (not shown) that extends radially between and supports the outer bypass wall 26 and the inner bypass wall 28.

The cam unit 164 includes a plate 166 and a shaft 168 in the illustrative embodiment as shown in FIG. 5. The plate 166 is coupled with the torque shaft 162 for rotation therewith. The shaft 168 is located in the metering ring and rotatably coupled with the plate 166. Rotation of the torque shaft 162 causes the plate 166 to rotate which moves the shaft 168 axially (with some circumferential component relative to the axis 11). Because the metering ring 112 is coupled with the shaft 168, axial movement of the shaft 168 moves the metering ring 112 axially with the shaft 168. The cam unit 164 is rotated by the torque shaft 162 to move the metering ring 112 between the fully open and the fully closed positions as suggested in FIGS. 3 and 4.

The cooling air metering system 16 further includes a controller 125 in the illustrative embodiment. The controller 125 is electronically connected with the actuator 116 and the heat exchanger 126 of the heat exchanger assembly 114. The controller 125 is configured to receive input and generate instructions to activate the actuator 116. In some examples, the controller 125 receives input from another controller or from sensors with data indicative of a condition of the gas turbine engine 10. For example, the condition could be take-off, climb, cruise, or landing. The data include temperature and/or pressure measurements. The controller 125 is programmed to move the metering ring 112 to the fully closed position during cruise and to move the metering ring 112 to an open or fully open position during takeoff or climb. The controller 125 is programmed to i) modulate the cooling air that passes through the metering ring 112, ii) vary a temperature of the cooling air by adjusting flow in the heat exchanger 126, or iii) modulate and vary a temperature of the cooling air. In particular, the controller 125 is programmed to move the actuator 116 to cause the metering ring 112 to move between the open position and the closed position and anywhere in-between to modulate how much compressed air is directed inward through the heat exchanger assembly 126 and to the radial turbine 60. The controller 125 is further programmed to vary a flow of cooling fluid in the heat exchanger 126 to vary and control the temperature of the compressed air that flows through the heat exchanger 126. In some situations, no cooling is performed by the heat exchanger 126.

During operation of the gas turbine engine 10, the metering ring 112 may be in the fully closed position as shown in FIG. 3. In the fully closed position, the forward end of the metering ring 112 is engaged with the inner wall 46 of the diffuser 38 and the aft end of the metering ring 112 is engaged with the turbine inlet duct 64 so that the gap between the diffuser 38 and the turbine inlet duct 64 is closed by the metering ring 112. The compressed air exiting from the diffuser 38 is blocked from flowing radially inward between the centrifugal compressor 32 and the radial turbine 60 by the metering ring 112. The compressed air flows axially aft between the inner bypass wall 28 and the combustor 20. The compressed air enters the aft end of the combustor 20 and is mixed with fuel and combusted wherein the gases are directed into the turbine 22. The metering ring 112 may be in the fully closed position during gas turbine engine conditions such as cruise conditions in which the gas turbine engine 10 is not near max limits and less cooling or the radial turbine 60 and/or axial turbine 62 is desired.

The metering ring 112 is movable selectively to the fully opened position as shown in FIG. 4 and any open position between the fully opened position and the closed position. The actuator 116 receives a signal from the controller 125 and rotates the torque shaft 162 and cam unit 164 to cause the metering ring 112 to translate axially forward to open the gap between the centrifugal compressor 32 and the radial turbine 60.

In one of the opened positions, the forward end of the metering ring 112 is engaged with the inner wall 46 of the diffuser 38 and the aft end of the metering ring 112 is spaced apart from the turbine inlet duct 64 so that the gap between the diffuser 38 and the turbine inlet duct 64 is partially or fully open. A majority of the compressed air exiting the diffuser 38 flows axially aft between the inner bypass wall 28 and the combustor 20 to be mixed fuel and combusted. A portion of the compressed air flows radially inward through the gap between the centrifugal compressor 32 and the radial turbine 60 as suggested in FIG. 4.

The portion of compressed air flows radially through the holes 140 in radial outer wall 108 of the duct insert 128, through the heat exchanger 126 where heat is removed from the air. The portion of the compressed air then flows into the cavity 138. The portion of compressed is split between two paths after the cavity 138.

In a first path, the portion of compressed air flows through the passages 154 defined by the vanes 156 in the outlet ring 148. The portion of compressed air flows through the holes 80 in the turbine impeller hub 70 and into the cooling passageways 84 formed in each of the turbine impeller blades 72 to cool the turbine impeller blades 72. Illustratively, the cooled portion of the compressed air flows through the cooling passageway 84 before exiting the turbine impeller blade 72 and entering the gas path in the turbine 22.

In a second path, the portion of compressed flows radially inward through the holes 142. The portion of the compressed air flows axially between the shaft 15 and an inner surface of the turbine impeller hub 70 until it reaches holes 82 to cool the turbine impeller hub 70. The portion of compressed air flows radially outward out of the holes 82 formed in the turbine impeller hub 70 and enters the air cavity 108. The air cavity 108 is configured to feed the portion of the compressed air to other components of the axial turbine 62 to cool the components.

According to the present disclosure, a gas turbine engine 10 uses a sliding metering ring 112 to control the cooling flow passing through the fuel/air heat exchanger 126 to the radial turbine 60. In the illustrative embodiment, the actuator 124 includes three actuators that rotate torque tubes 162 which cause the metering ring 108 to slide axially to vary the area for the cooling fluid to flow. In some embodiments, the actuators 124 are driven by fuel, air, and/or electricity.

The air passes through the gap between the centrifugal compressor 32 and the radial turbine 60 and opened by the metering ring 112 and through the fuel/air heat exchanger 126 to cool the air before the air is directed into the radial turbine airfoils 72 and rotor bore of the radial turbine 60. Illustratively, the cooling flow is reduced at cruise conditions of the gas turbine engine 10 to improve fuel burn and the cooling flow is increased during takeoff and climb conditions to improve turbine durability. The metering ring 112 is configured to be moved between and stopped at any position including and between a fully opened position and a fully closed position to modulate the flow.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising:
    a centrifugal compressor comprising a compressor impeller configured to rotate about an axis to produce compressed air and a diffuser located radially outward and downstream of the compressor impeller,
    a combustor located axially aft of the centrifugal compressor and configured to receive the compressed air from the centrifugal compressor,
    a radial turbine located axially aft of the centrifugal compressor and fluidly connected to the combustor, and
    a cooling air metering system configured to selectively control a flowpath of the compressed air for cooling the radial turbine, the cooling air metering system including
    a metering ring that extends circumferentially around the axis and located axially between the diffuser and the combustor,
    a heat exchanger located axially between the centrifugal compressor and the combustor and radially inward of the metering ring, and
    an actuator coupled with the metering ring and configured to move the metering ring axially between an open position in which the metering ring is spaced apart axially from the radial turbine to allow the compressed air to flow radially inward between the centrifugal compressor and the radial turbine through the heat exchanger and into the radial turbine and a closed position in which the metering ring is located axially adjacent the radial turbine to block the compressed air from flowing radially inward between the centrifugal compressor and the radial turbine,
    wherein a forward section of the metering ring is engaged with a radial inner surface of the diffuser and is configured to slide axially along the diffuser between the open position and the closed position.

2. The gas turbine engine of claim 1, wherein the radial turbine includes a turbine wheel having a turbine impeller hub that extends circumferentially about the axis and a turbine impeller blade that extends outward away from the turbine impeller hub, the turbine impeller hub is formed to define a first cooling hole that extends through the turbine impeller hub at an axial forward end of the turbine impeller hub, and the turbine impeller blade is formed to define a cooling passageway therein that is in fluid communication with the first cooling hole, and the first cooling hole is configured to receive the compressed air in response to the metering ring being in the open position.

3. The gas turbine engine of claim 2, wherein the cooling air metering system includes a heat exchanger assembly that includes the heat exchanger and a duct insert that supports the heat exchanger in place, the duct insert is formed to define a cavity that receives the compressed air after the compressed air flows through the heat exchanger, and the duct insert includes an outlet ring having a plurality of vanes configured to direct the compressed air out of the cavity and into the first cooling hole.

4. The gas turbine engine of claim 2, wherein the turbine impeller blade is formed to define a cavity therein to define the cooling passageway.

5. The gas turbine engine of claim 2, wherein the turbine impeller hub is formed to define a second cooling hole that extends radially through the turbine impeller hub at an axial aft end of the turbine impeller hub and the second cooling hole is in fluid communication with the compressed air in response to the metering ring being in the open position.

6. The gas turbine engine of claim 1, wherein the cooling air metering system further includes a controller connected with the heat exchanger and the controller is programmed to vary a flow of cooling fluid through the heat exchanger so as to vary selectively a temperature of the compressed air.

7. The gas turbine engine of claim 1, wherein the cooling air metering system further includes a controller connected with the actuator and the controller is programmed to cause the actuator to move the metering ring to the closed position in response to the gas turbine engine being in a cruise condition and to move the metering ring to the open position in response to the gas turbine engine being in a takeoff or climb condition.

8. A gas turbine engine comprising:
    a centrifugal compressor configured to produce compressed air,
    a radial turbine located axially aft of the centrifugal compressor relative to an axis of the gas turbine engine, and
    a cooling air metering system that includes a metering ring and an actuator, the metering ring extends circumferentially around the axis and is located axially between the centrifugal compressor and the radial turbine, and the actuator is coupled with the metering ring and configured to move the metering ring between an open position in which the metering ring opens a gap between the radial turbine and the centrifugal compressor to allow the compressed air to flow between the centrifugal compressor and the radial turbine and a closed position in which the metering ring closes the gap to block the compressed air from flowing between the centrifugal compressor and the radial turbine,
    wherein the cooling air metering system further comprises a heat exchanger assembly that includes a heat exchanger located between the centrifugal compressor and the radial turbine and configured to receive the compressed air in response to the metering ring being in the open position,
    wherein the cooling air metering system further includes a controller connected with the heat exchanger and the controller is programmed to vary a flow of cooling fluid through the heat exchanger so as to vary selectively a temperature of the compressed air.

9. The gas turbine engine of claim 8, wherein the heat exchanger assembly further includes a duct insert located axially between the centrifugal compressor and the radial turbine, the heat exchanger is supported by the duct insert, and the duct insert is formed to define a plurality of radial outer holes and a plurality of radial inner holes to allow the compressed air to flow radially through the duct insert.

10. The gas turbine engine of claim 9, wherein the duct insert is formed to define an outlet ring having a plurality of vanes that define passages through the duct insert and the passages are configured to direct the compressed air toward the radial turbine in response to the metering ring being in the open position.

11. The gas turbine engine of claim 8, wherein the radial turbine includes a turbine wheel having a turbine impeller hub that extends circumferentially about the axis and a turbine impeller blade that extends outward away from the turbine impeller hub, the turbine impeller hub is formed to define a first cooling hole that extends through the turbine impeller hub at an axial forward end of the turbine impeller hub, and the turbine impeller blade is formed to define a cooling passageway inside the turbine impeller blade that is in fluid communication with the first cooling hole.

12. The gas turbine engine of claim 8, wherein the controller is connected with the actuator and is programmed to move the metering ring between the open and the closed position.

13. The gas turbine engine of claim 8, wherein the radial turbine includes a turbine wheel having a turbine impeller hub that extends circumferentially about the axis and a turbine impeller blade that extends outward away from the turbine impeller hub and the turbine impeller hub is formed to define a cooling hole that extends radially through the turbine impeller hub at an axial aft end of the turbine impeller hub.

14. The gas turbine engine of claim 8, wherein the controller is connected with the actuator and programmed to cause the actuator to move the metering ring to the closed position in response to the gas turbine engine being in a cruise condition and to move the metering ring to the open position in response to the gas turbine engine being in a takeoff or climb condition.

15. A method of operating a gas turbine engine, the method comprising:
  compressing air with a centrifugal compressor,
  mixing fuel with the air and combusting the fuel and the air with a combustor to form combusted gases,
  rotating a radial turbine about an axis with the combusted gases,
  moving a metering ring relative to the centrifugal compressor and the radial turbine between an open position in which a portion of the air is allowed to flow radially inward between the centrifugal compressor and the radial turbine and a closed position in which the air is blocked from flowing radially inward between the centrifugal compressor and the radial turbine,
  directing the portion of the air through a heat exchanger located between the centrifugal compressor and the radial turbine in response to the metering ring being in the open position, the heat exchanger being supported by a duct insert located axially between the centrifugal compressor and the radial turbine, the duct insert being formed to define a plurality of radial outer holes and a plurality of radial inner holes to allow the compressed air to flow radially through the duct insert, and the duct insert being formed to define an outlet ring having a plurality of vanes that define passages through the duct insert, and
  directing the portion of the air from an outlet of the heat exchanger through the outlet ring into a turbine impeller blade of the radial turbine in response to the metering ring being in the open position.

16. The method of claim 15, further comprising moving the metering ring to the closed position in response to the gas turbine engine being in a cruise condition and moving the metering ring to the open position in response to the gas turbine engine being in a takeoff or climb condition.

17. The method of claim 15, further comprising varying a flow of cooling fluid through the heat exchanger so as to vary a temperature of the portion of the air.

18. The method of claim 15, wherein the radial turbine includes a turbine wheel having a turbine impeller hub that extends circumferentially about the axis and the turbine impeller blade that extends outward away from the turbine impeller hub, the turbine impeller hub is formed to define a first cooling hole that extends through the turbine impeller hub at an axial forward end of the turbine impeller hub and a second cooling hole that extends radially through the turbine impeller hub at an axial aft end of the turbine impeller hub, and the turbine impeller blade is formed to define a cooling passageway therein that is in fluid communication with the first cooling hole, and the first cooling hole is configured to receive the portion of the air in response to the metering ring being in the open position.

* * * * *